United States Patent
Desai et al.

(10) Patent No.: US 7,966,513 B2
(45) Date of Patent: Jun. 21, 2011

(54) AUTOMATIC CLASSIFICATION OF BACKUP CLIENTS

(75) Inventors: Asit A. Desai, San Ramon, CA (US);
Richard C. Zulch, Orinda, CA (US)

(73) Assignee: EMC Corporation, Hopkinton, MA (US)

( * ) Notice: Subject to any disclaimer, the term of this patent is extended or adjusted under 35 U.S.C. 154(b) by 531 days.

(21) Appl. No.: 11/347,758

(22) Filed: Feb. 3, 2006

(65) Prior Publication Data
US 2007/0220319 A1    Sep. 20, 2007

(51) Int. Cl.
 *G06F 11/00* (2006.01)
(52) U.S. Cl. ............... 714/1; 714/6; 711/162; 707/653; 707/654
(58) Field of Classification Search ............... 714/1, 13, 714/6; 713/150; 707/653; 711/162
See application file for complete search history.

(56) References Cited

U.S. PATENT DOCUMENTS

| | | | | |
|---|---|---|---|---|
| 5,958,062 A * | 9/1999 | Komasaka et al. | ............... | 714/1 |
| 6,145,090 A * | 11/2000 | Yamaguchi et al. | ............... | 714/4 |
| 6,202,169 B1 * | 3/2001 | Razzaghe-Ashrafi et al. | .... | 714/6 |
| 6,609,215 B1 * | 8/2003 | Hamilton et al. | ............... | 714/15 |
| 7,360,110 B1 * | 4/2008 | Schmokel et al. | ................ | 714/1 |
| 2003/0225801 A1 * | 12/2003 | Devarakonda et al. | ....... | 707/205 |
| 2004/0039925 A1 * | 2/2004 | McMillan et al. | ............... | 713/189 |
| 2004/0240669 A1 * | 12/2004 | Kempf et al. | ................. | 380/277 |
| 2004/0260973 A1 * | 12/2004 | Michelman | ..................... | 714/13 |
| 2005/0015662 A1 * | 1/2005 | Scanlan | ......................... | 714/13 |
| 2005/0283662 A1 * | 12/2005 | Li et al. | .......................... | 714/13 |
| 2006/0041726 A1 * | 2/2006 | Steubing | ....................... | 711/162 |
| 2006/0136714 A1 * | 6/2006 | Yagi et al. | ..................... | 713/150 |
| 2006/0259724 A1 * | 11/2006 | Saika | ............................ | 711/162 |
| 2007/0198823 A1 * | 8/2007 | Blew et al. | .................... | 713/150 |

* cited by examiner

*Primary Examiner* — Yolanda L Wilson
(74) *Attorney, Agent, or Firm* — Barry N. Young

(57) ABSTRACT

A method of automatically classifying clients into different backup policy groups according to pre-selected criteria, such as type of client, whether the client is a server, a desktop or a mobile computer, the department or business unit, or even the user. The method uses information obtained from the client itself to classify the client. This information includes the kind of processor platform and operating system in the client, the type and version of software being run, and whether the client has a battery, indicating that it is a mobile computer. Other information that can be used to classify the client for backup may be obtained from information that identifies the user, the department to which the client is assigned, and the location in which it is used. The process enables a mobile client traveling to another site of an enterprise to connect to a local LAN of the enterprise and be authenticated for backup, and to be automatically assigned an appropriate backup classification.

20 Claims, 6 Drawing Sheets

AUTOMATIC CLASSIFICATION OF BACKUP CLIENTS

CROSS REFERENCE TO RELATED APPLICATIONS

This application is related to commonly-owned co-pending application filed concurrently herewith and entitled "Automatic Authentication of Backup Clients" Ser. No. 11/347,124.

BACKGROUND OF THE INVENTION

This invention relates generally to methods and systems for backing up computer data in computer systems, and more particularly to the classification of client computers into different groups for backup of the clients.

Computer systems store data that is unique and often critical, and, if lost, would frequently be expensive, difficult or impossible to replace. The data is normally stored on hard disks or other storage devices which are subject to the possibility of failure. Additionally, data may also be lost by theft, fire or other disaster, and frequently the data lost is permanent. Accordingly, backup methods and systems have been developed to maintain controlled redundancy of data to enable data to be recovered in the event of a disaster and to avoid or minimize the loss of the data.

Backup systems copy source data from a computer source storage volume to backup media so that if the original source data is lost, it may be restored from the backup copy. Since data in a computer system is continuously being created or modified, it is important that backup be performed frequently to ensure that the backup copy of the data is current. Most backup in large systems is batch-oriented and performed at predetermined times during a backup window, such as at night when the computer system is not being used for normal processing operations. In computer systems having a plurality of interconnected computers, such as a network, one computer, referred to as a backup computer or a backup server, may manage the backup process and copy source data from the other interconnected computers on the network, referred to as backup client computers or simply as "clients", to backup media. The backup server executes a backup software application that manages the backup process, and the client computers execute client backup software applications that cooperate with the backup server application and read source data from source volumes and forward the data to the backup server for backup.

Generally, a system administrator must install the client backup software application on each client machine and assign an access password to the machine. Passwords are necessary to authenticate clients, and used to ensure that an unauthorized or another copy of backup server software does not obtain access to the client's data. The access passwords must then be logged into the backup server so that the backup server can subsequently access the clients for backup. In enterprises having many different clients, it is a time-consuming and burdensome process to install the client backup software application on each client machine, assign a password, and then log the password for the client machine with the backup server. The administrator must physically go to each client machine to manually install the client software and to log each password with the backup server. In large enterprises, new clients are continually being added to the network, and this imposes a continuing burden on administrators of repeating the backup software installation process for each new machine.

Additionally, since different clients on a network typically store and process different kinds of source data, have different activities, and perform different functions, they may have quite different backup requirements. For example, desktop computers may have different backup requirements from mobile computers, such as laptops, and servers may have different backup requirements from either desktops or laptops. Moreover, the computers in one business group or unit of an enterprise, e.g., finance, engineering, executive management, etc., may have different backup requirements than those in another business unit or in another location. Individual users may have individual backup requirements.

In order to accommodate these varying backup requirements, administrators either must set up an individual backup policy tailored to the particular client, or group the client with other clients that have similar backup requirements and assign an appropriate policy to the group. In either case, this typically must be done manually on a case-by-case basis, which imposes an additional burden on a systems administrator must when setting up clients.

Furthermore, large enterprises typically have a number of geographically separated sites, each having its own local area network ("LAN") connected to an enterprise wide area network ("WAN"), and each LAN having its own local backup server for backing up clients on that LAN. Frequently, mobile clients, such as laptop computers, travel between the different sites and connect to local LANs. When a visiting mobile client connects temporarily to such a local LAN, and is authenticated for backup on that LAN, it is desirable to also apply the appropriate backup policy to that client. This involves the same manual setup burdens and inconveniences on an administrator as encountered during initial setup of the client, as discussed above.

It is desirable to provide backup systems and methods which address the foregoing and other problems of conventional backup approaches and that facilitate classification of clients into groups according to their backup requirements so that appropriate backup policies may be applied. It is to these ends that the present invention is directed.

DESCRIPTION OF PREFERRED EMBODIMENTS

The present invention is particularly well adapted to authenticating and applying backup policies to client computers in an enterprise computer system network, and will be described in that context. As will be appreciated, however, this is an illustrative of only one utility of the invention.

Figure 1:
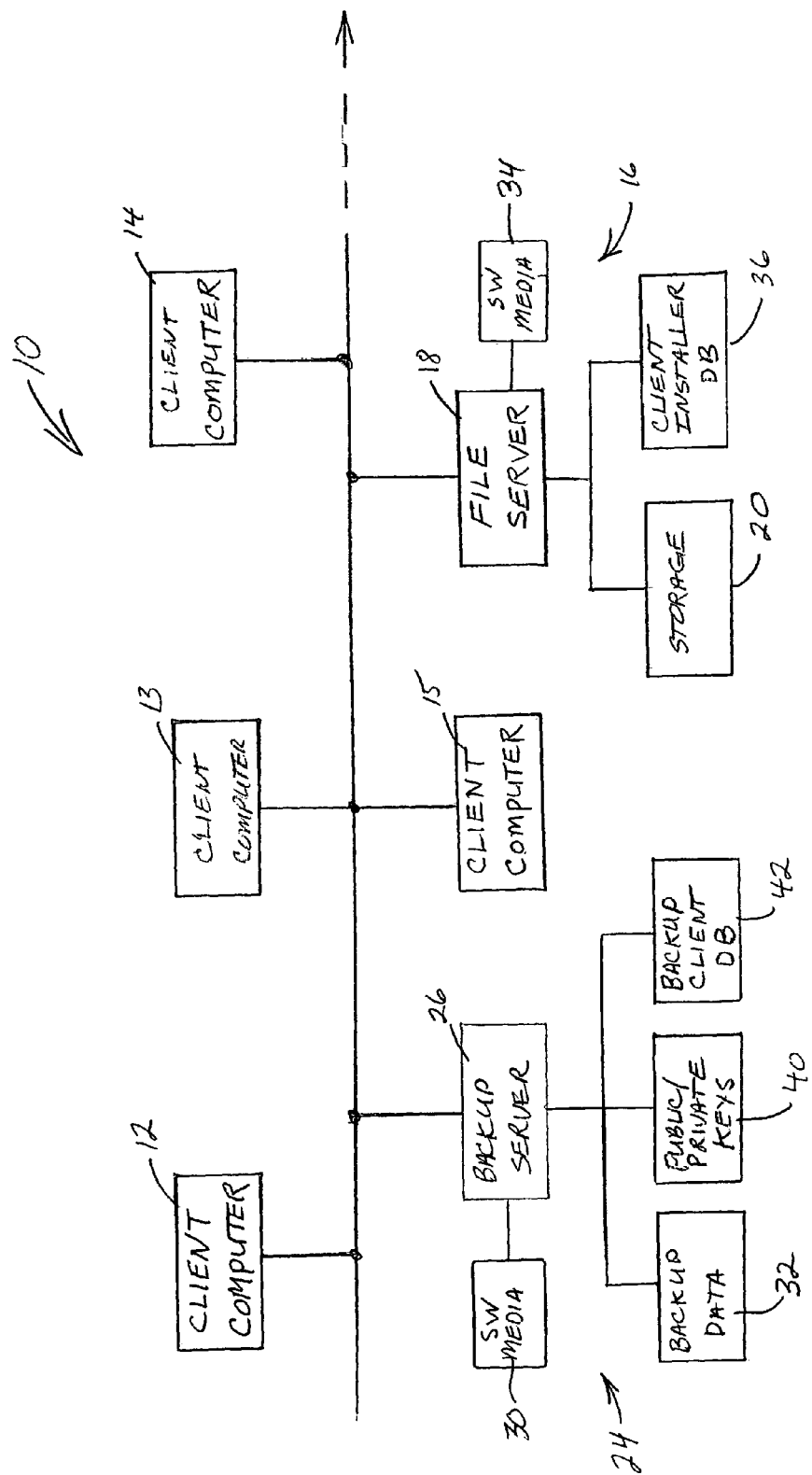
FIG. 1 is a block diagram of a computer system network of the type with which the invention may be employed.

FIG. 1 is a block diagram of a computer system network 10 of the type with which the invention may be employed. Computer network 10 may be a standalone network, or a local area network (LAN) or a subnet of a wide area network (WAN) of a larger enterprise, for example. Network 10 may comprise a plurality of interconnected computers including, for example, servers, desktop computers, mobile computers such as laptop computers, and appliances of various types. As shown in the figure, the interconnected computers may comprise a plurality of computers 12-15 which are referred to herein as "client computers" or simply as "clients" and one or more server computer systems, such as a file server system 16 comprising a file server computer 18 and storage 20. The network may further comprise a backup computer system 24 comprising a backup server 26 that may provide centralized backup for the computers on network 10. The backup server may simply be another computer on the network that executes a backup software computer program comprising machine executable instructions stored on computer readable media 30 that controls the computer to perform a backup process. The backup process backs up source data from client computers 12-15 and from file server system 16 to backup media 32 to provide a redundant data set. Client computers 12-15 and file server 18 may each also execute client backup software applications that may be included on software media 30 of the backup server and/or on another computer readable media 34 and input to storage 20 of file server 18. The client backup software application may be installed on the client computers from the backup server or from the installer storage 36 of the file server as will be described in more detail shortly. The client backup software on file server storage 20 may be loaded from media 30 of the backup server, or, alternatively, may be loaded from computer readable media 34 that inputs the software to the client installer storage database 36 of the file server.

As further shown in FIG. 1, and as will be described, in the preferred embodiment the backup server may also comprise storage 40 for public key/private key certificate files. Additionally, backup server system 24 may include a backup client database 42 which stores a list of network clients which have been logged into the backup server for backup service. Database 40 preferably includes a backup group classification for each client that indicates a particular backup policy that is to be applied to the client. The backup server may use the public key/private key certificate files 40 to automatically authenticate the client and automatically classify the client into the appropriate backup category. During backup, the backup server may use the classification in the backup client database 42 to back up each client on the network according to criteria appropriate to that client, as will be described.

In order to backup a client on the network 10, it is necessary that the client have the client backup software application installed. Also, in order to prevent access to the client's data by an unauthorized or simply another copy of backup software, it is necessary that there be an authentication process for the client and backup server in order to preclude access to the client's data. In the past, a technique that has normally been employed to limit access to clients on a network has been to install a password in each client and require that an accessing computer have the client's password in order to access the client. The use of a password to authenticate and access clients has been problematic because it has required a system administrator, or a user, to physically go to a client machine, manually initiate the software installation process, and upload the password to a backup server so the client can be backed up. In networks with many client machines, especially in enterprises which may have hundreds of clients, it is a time-consuming and burdensome process to manually install client backup software applications on each client machine, and then log a password for each client with the backup server to enable authentication of the client in order for backup to be performed.

Figure 2:
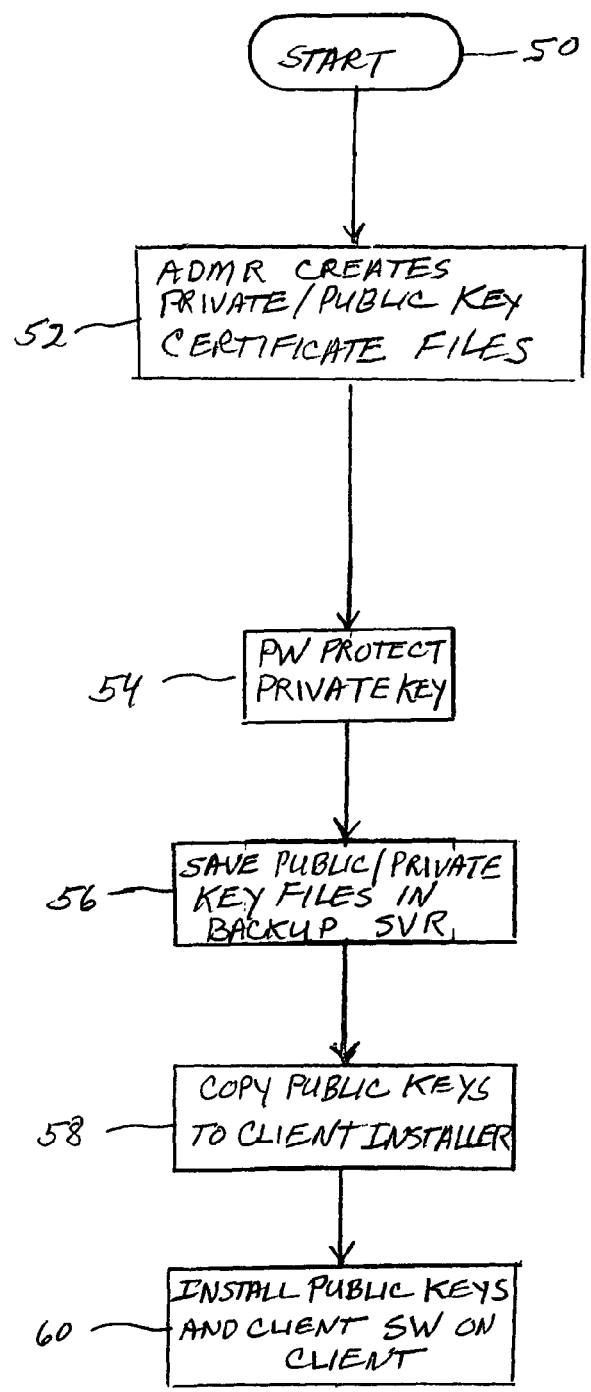
FIG. 2 is a flowchart illustrating a process for authenticating and setting up client computers.

FIG. 2 illustrates a preferred embodiment of a process which avoids the necessity of a system administrator physically accessing a client in order to set up a password as an authentication mechanism to access the client to install backup software, to add the client to a backup database, or to communicate with the client for backup classification purposes. As will be described, in the process as illustrated in FIG. 2, a public key encryption system is employed to enable the backup server to be authenticated with the client computer for backup and for communication with the backup server.

Referring to FIG. 2, in accordance with the preferred process, the process begins at 50. A system administrator first creates at 52 a private key/public key certificate file containing, preferably, a plurality of different private/public key certificates. For example, there may be ten private/public key certificate pairs included in the file, each of which may correspond to and be used with, for example, a different backup server of a different LAN of an enterprise. Next, at step 54 the administrator password protects the private key certificate, and at step 56 stores the protected private key and the public key certificate files at the backup server. The private key certificate file is stored only at the backup server, since this private key is used for decryption and it must be stored securely. Otherwise, anyone with access to the private key file would have access to all of the clients that were installed with the corresponding public key. In accordance with an alternative embodiment, the administrator may password protect and store multiple private keys of the set of public/private key pairs on the backup server. This conveniently enables clients on other networks that may use a particular one of the private keys to be authenticated and connected to the backup server.

Next, at step 58 of FIG. 2, the public key certificate files may be copied to the client installer database 36 of file server 16. When a new client machine is installed on the network, the public key certificate files and the client backup software from the client installer database 36 may be installed automatically and together on the new client machine, as shown at step 60 of FIG. 2. The public key certificate files and the backup software are preferably installed together on the new client because the new client will require the appropriate public key to communicate with the backup server 26 in order to be backed up.

There are a number of advantages to using a public key for authentication rather than a password. One is that the public key files and the client backup software may be installed simultaneously and automatically, as by using conventional push software technology such as Microsoft SMS to silently install them on each client machine. This permits an administrator to quickly and easily set up new client machines on the network with the appropriate backup software and public keys to enable them to be backed up, without the necessity of physically going to each machine and manually installing the software and keys. This is a significant time saver, and permits a large number of client machines to be easily and quickly added to the network and provided with client backup software to enable them to be backed up on the backup server.

Moreover, using a public key system for secure communications between client machines and the backup server is advantageous for another reason. All client machines on the network can use the same public key corresponding to the private key stored on the backup server on that network to establish communications and facilitate authentication. Also, by installing multiple public keys on a client machine that correspond to private keys on other servers, clients can operate with other server without having to reestablish credentials.

Furthermore, a large enterprise may have a plurality of geographically separated sites. By assigning a different private key to the backup server at each site and installing a plurality of public keys on a mobile client corresponding to the plurality of backup server private keys, should the client travel to a different one of the geographically separated sites, the visiting mobile client will be able to communicate with the backup server at that site using the appropriate public key for that backup server. This will enable authentication so the local backup server can automatically add the visiting client to its backup client database and classify the client into the appropriate category for backup.

Figure 3:
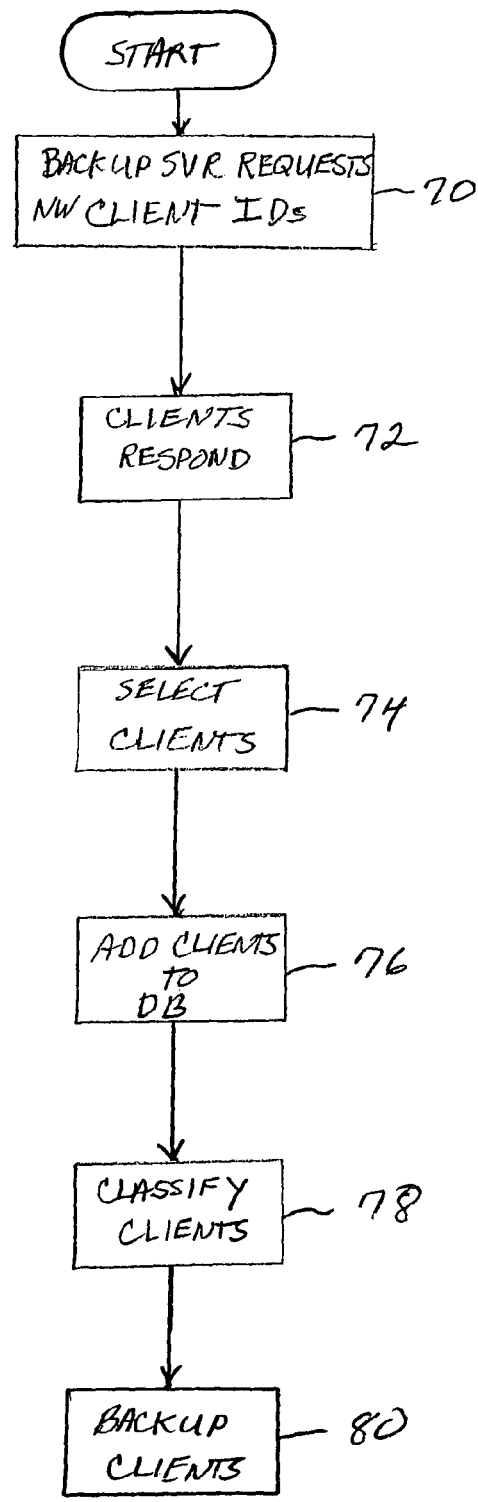
FIG. 3 is a flowchart illustrating a process for identifying clients for backup.
Figure 4:
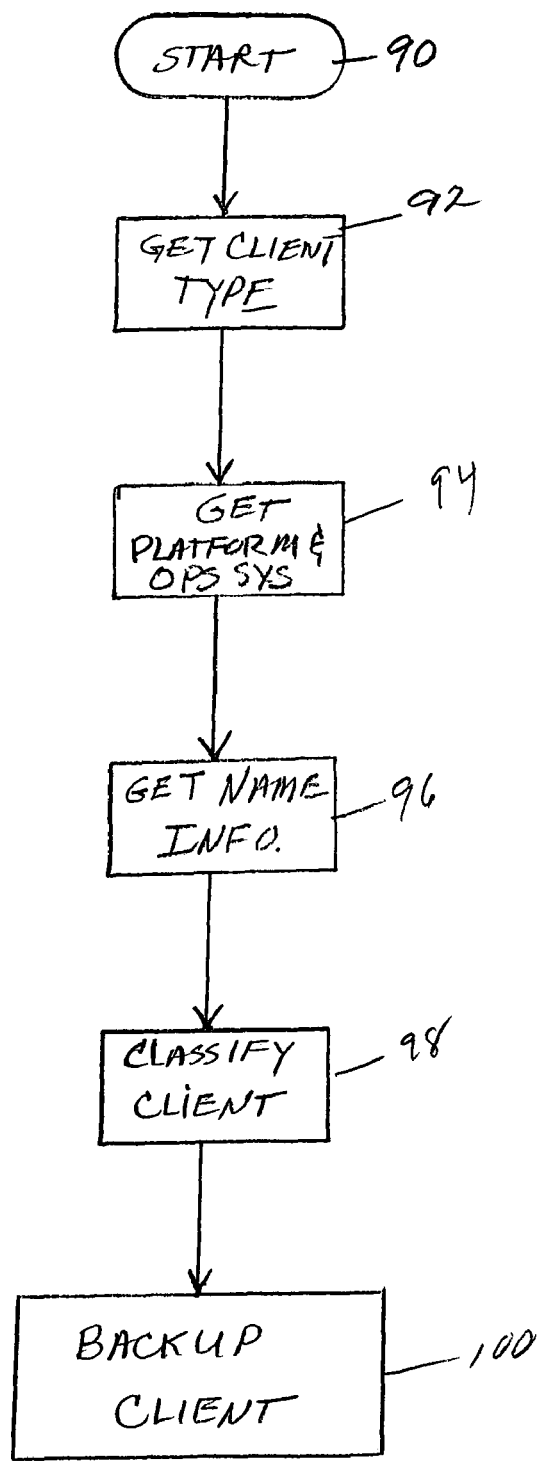
FIG. 4 is a flowchart illustrating an overview of a preferred process for automatically classifying clients to a backup category.
Figure 5:
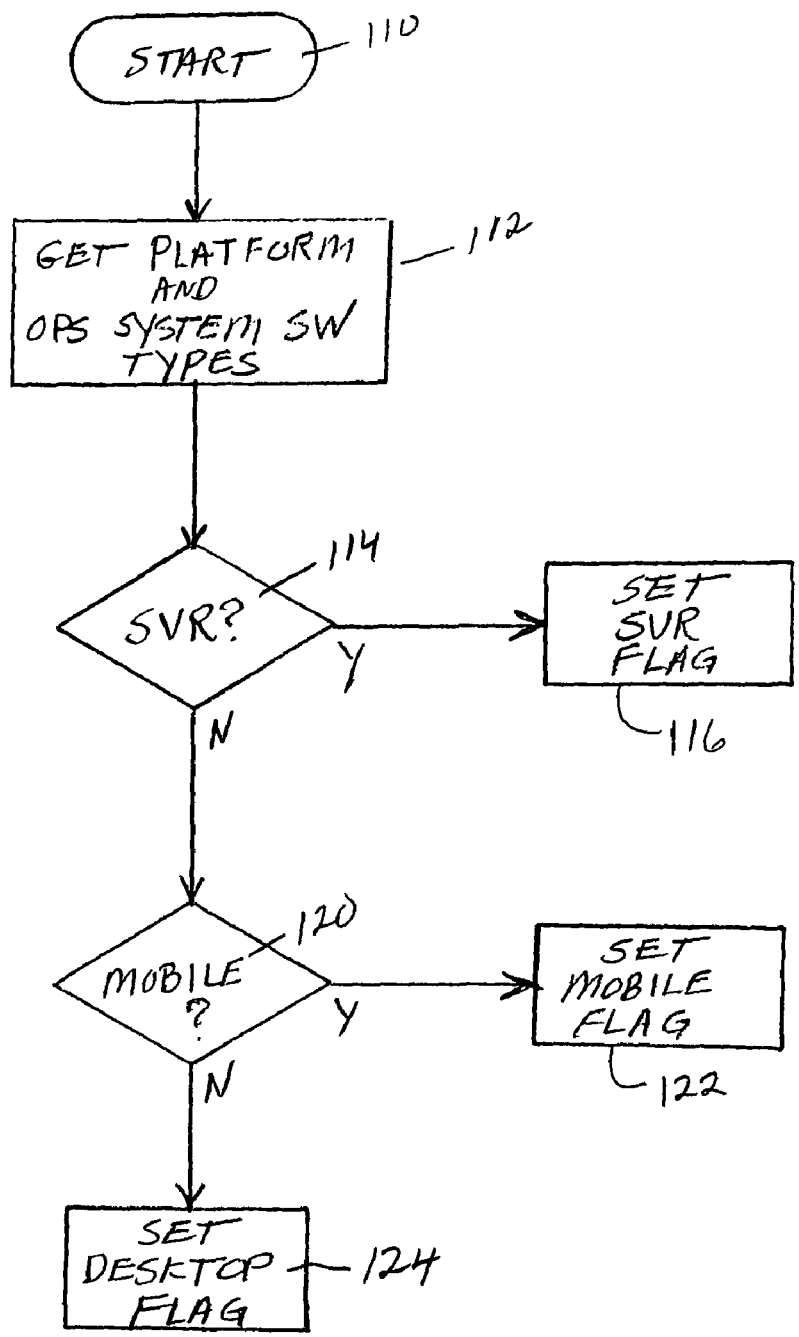
FIG. 5 is a flowchart illustrating in more detail a portion of the process of FIG. 4 for automatically determining a client machine type.
Figure 6:
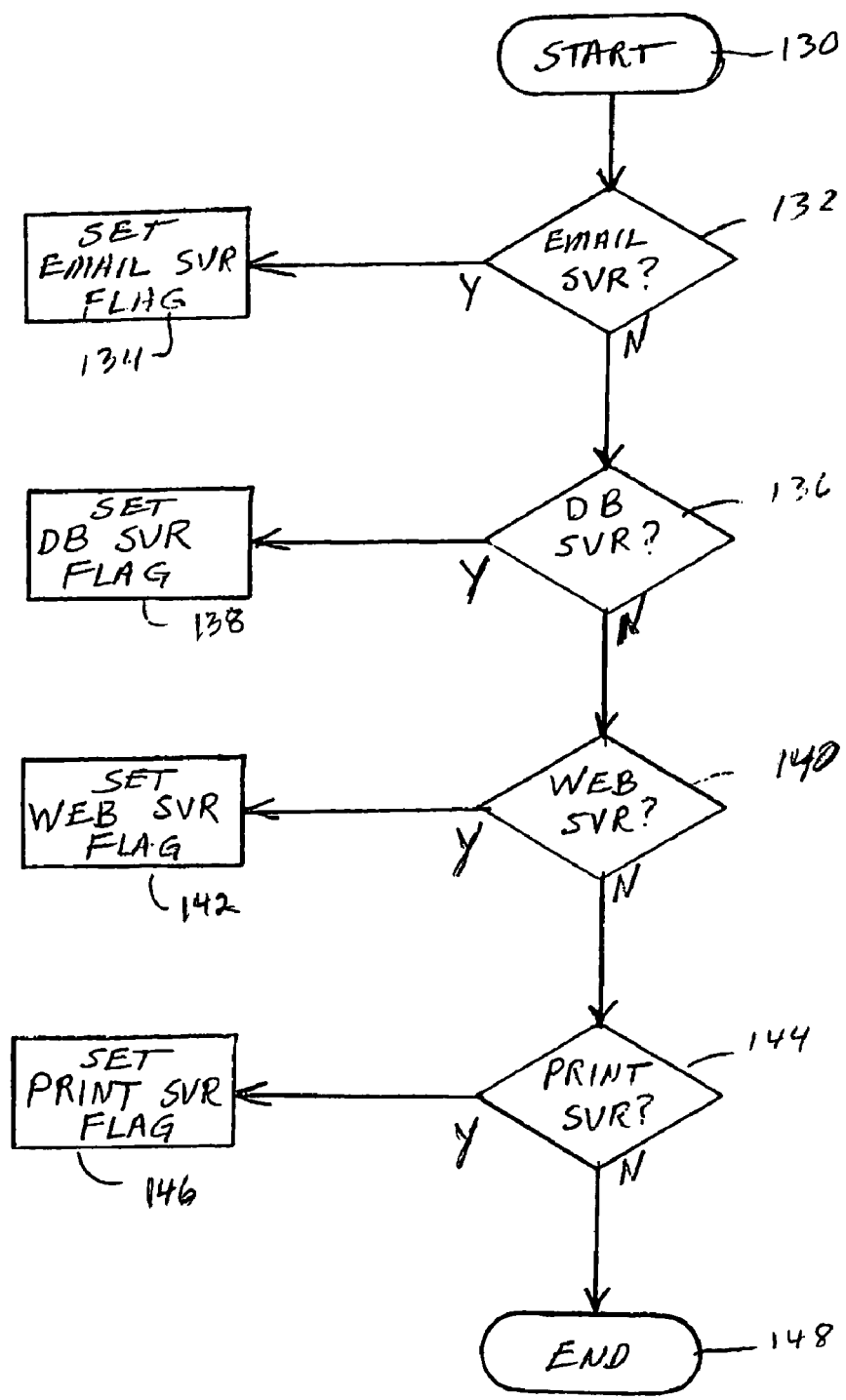
FIG. 6 is a flowchart illustrating in more detail a portion of the process of FIG. 4 for determining the server type of a server client.

FIG. 3 illustrates a preferred embodiment of a process by which a backup server 26 identifies clients on network 10 and selects the clients for adding to the client backup database 42 to enable the clients to be backed up. In order for the backup server to add new clients to the database, it must first identify the new clients. As shown in FIG. 3, the backup server may begin this process as indicated at 70 by broadcasting a request to all clients on the network to identify themselves. At 72, the clients on the network respond by sending their identifiers (IDs) in the clear to the backup server. The backup server uses the client IDs to select clients, at 74, that have already been logged in to the database and that should be backed up. The backup server also identifies and selects at 74 any new clients on the network that need to be added to the backup database. The new clients may be then added to the database for backup, as indicated at 76, preferably automatically as explained in more detail in the above-referenced co-pending related application entitled "Automatic Authentication of Backup Clients" Ser. No. 11/347,124, the disclosure of which is incorporated by reference herein. Upon being added to the backup database, the clients may be automatically classified into different backup categories to which different backup policies may be applied, as shown in FIGS. 4-6 and as will be described more fully below. After the clients have been added to the database and classified, they may be backed up appropriately.

The process illustrated in FIG. 3 may be performed automatically at one or more predetermined times during the day according to predefined backup scripts stored in the backup server. The process identifies any new clients on the network, whether they are newly added clients or visiting clients from another network, so that the clients may be added to the backup process, and classifies the new clients into a backup category. The clients may then be backed up.

Preferably, clients added to the backup database are also automatically classified into different client groups or categories in order to backup the clients in accordance with different criteria or policies. It is desirable, for example, to have backup policies which are tailored to different types of clients. For example, file servers which manage and store shared files for clients on a network have a large volume of source data which is undergoing frequent change. Accordingly, file servers have different backup requirements from, for example, application servers, email servers, web servers, etc., and have different backup requirements from an individual desktop client machine or a mobile laptop. Moreover, different types of clients, as well as client machines in different working units of an enterprise may have very different backup requirements from other clients on the network because, for example, of the type of data, the volume of data, or the critical nature of the data that they handle or the functions they perform.

FIG. 4 illustrates an overview a preferred embodiment of a process for automatically classifying clients into backup categories or groups to which different backup policies appropriate to the clients may be applied. FIGS. 5 and 6 illustrate more specific aspects of the process of FIG. 4. This classification process may be performed by the backup server, which then may add the appropriate backup classification to the clients in the backup database so that they may be backed up in accordance with different policies.

Broadly, as shown in FIG. 4, the process may first determine client type, e.g., whether the client is a server, and, if so, what type of server, whether the client is a mobile client, such as a laptop, or whether the client is a desktop. Next, it may determine specific client machine information, such as the installed processor and the software being run. Finally, it may determine other user specific information, as will be described.

The backup server may then classify the client into an appropriate backup group using the above and other information and pre-selected criteria. For example, when the client status is obtained at step 92 of FIG. 4, part of the status information may include information on the particular processor platform and operating system of the client. The status information might indicate, for instance, "MAC on Intel" or "Windows on Intel", etc. This information may be used for further classifying the client as to in accordance with a backup policy. In addition, the client status may also include information on other kinds of software being run by the client.

Referring to FIG. 4, the client classification process begins at step 90. At step 92, the backup server may execute a process (described in more detail in FIGS. 5 and 6) to identify the type of client, such as whether the client is a server, a mobile client, or a desktop machine, and to obtain certain other more specific type information, such as the kind of server, for example. Some of this is information may be stored on the client, in configuration files, for example, and the client may convey it in response to a request from the backup server. Next at 94, the process may obtain information about the processor platform in the client and the operating system software being run, as described above. At step 96, the process may obtain identification information such as the client machine's computer name, the organization or business unit in which the user works, the location of the machine, etc., as by reading the information from the client itself or, if the client computer is a member of a directory service, by reading the full distinguished name of the client, as explained more fully below. Next, at 98, the process may apply pre-selected criteria and use the information obtained in the foregoing steps, and any other information about the client computer to classify the client into an appropriate backup group. At 100, the client may be backed up in accordance to the criteria applicable to the group into which the client was classified.

As indicated above, at 96 the process may read the full distinguished name of the client from an active directory on the network, and use this information as criteria for classifying the client for backup. The full distinguished name may have a format such as, for example, "cn=johnlaptop, ou=engineering,o=emc,c=us", where the name indicates the name of the computer (cn), the department or unit in which the client works (ou), the organization, e.g., the division or company (o), and the location, such as the country (c). This kind of information is typically stored in a network directory such as a Windows Active Directory or NetWare eDirectory by the IT group of the enterprise, for example, during initial configuration of the client before giving it to the end user.

FIG. 5 illustrates in more detail step 92 of FIG. 4 which obtains the client type. As shown, the process begins at 110.

At 112, the backup server may query the client to obtain information about the type of processor platform and operating system on the client. Next, at 114, the backup server determines whether the client is a server, as by looking at the operating system being run, and may then execute a process (described more fully below and illustrated in. FIG. 6) to determine the type of server. If the client is a server, the process sets a flag at 134. If not, at 120 the process determines whether the client is a mobile machine, such as a laptop, as by querying the client as to battery status. If the client responds positively, this indicates that it has a battery, and is, therefore, a mobile client. A flag is then set at 122. Otherwise a flag may be set at 124 indicating that the client is a desktop machine.

FIG. 6 illustrates in more detail a preferred process that may be performed at 114-116 of FIG. 4 for determining the type of server and for setting an appropriate flag for classification. Determining the type of server may be done, for example, from the type of operating system and server software being executed on the server. Beginning at 130, the process determines whether the server is an email server, as by determining whether the server is running email server applications. If so, a flag is set at 134. If not, the process may next determine whether the server is a database server at 136, and set a flag at 138 if it is. Otherwise, at step 140, the process determines if the client is a web server, and sets a flag at 142. If the server is not a web server, the process advances to step 144 where it determines whether the client is a print server, and sets a flag at 146 if it is. The process of FIG. 6 may end at 148.

As may be appreciated, however, the process of FIG. 6 may include further steps to determined additional information, such as, for example, whether the client may be another type of server. Also, it may determine other information about the client, as by determining whether the client runs a particular type of software. Moreover, as will be appreciated, the backup server may simplify the classification process described above by omitting the entire process of FIG. 6, and simply determining that the client is running a server operating system. It may then classify the client more generally as a server client.

While the foregoing has been with reference to particular embodiments of the invention, it will be appreciated by those skilled in the art that changes in these embodiments may be made without departing from the principles and the spirit of the invention, which is defined in the appended claims.

The invention claimed is:

1. A method of automatically classifying a client computer connected to a backup computer, comprising: automatically obtaining by the backup computer information about the client computer; determining from said information a computer type of said client computer, said computer type indicating whether the client computer is one of a server, a mobile, or a desktop computer; and automatically classifying using said information and pre-selected criteria the client computer into one of a plurality of different backup categories according to the determined computer type, each backup category having a different predetermined backup policy applied to a client computer classified in such backup category.

2. The method of claim 1, wherein upon determining that said client computer is a server, further determining a server type of said client computer, and said classifying comprises assigning said client computer to a server type group having a predetermined backup policy appropriate for said server type group.

3. The method of claim 2, wherein said further determining of server type comprises determining from the client computer information about the kind of server software said client computer is running, and said classifying comprises assigning the client computer into said server type group based upon the server software being run.

4. The method of claim 1, wherein said determining comprises querying the client computer about battery status, and classifying said client computer as a mobile computer upon receiving a positive response to the query.

5. The method of claim 4 wherein said classifying comprises classifying the client computer as a desktop computer upon receiving a negative response to said query.

6. The method of claim 1 further comprising determining whether the client computer is included in a backup database that identifies a plurality of client computers that are backed up by said backup computer; upon determining that the client computer is not included in the database, adding the client computer to the backup database for backup; and indicating in said database the backup category classification of said client computer.

7. The method of claim 6 further comprising authenticating said client computer by obtaining from the client computer identity information encrypted using a public key of the client computer; decrypting the encrypted information using a private key of the backup computer that corresponds to the public key; and said adding comprises adding the client computer to the backup database upon the decrypted identity information being readable by the backup computer.

8. The method of claim 1, wherein said client computer and said backup computer are connected by a network having a plurality of computers, and wherein said method further comprises classifying the plurality of the computers on said network into appropriate ones of said plurality of backup categories based upon the computer information of each computer.

9. A method of automatically classifying a client computer connected to a backup computer, comprising: automatically obtaining by the backup computer information about the client computer; and automatically classifying using said information and pre-selected criteria the client computer into one of a plurality of different backup categories, each backup category having a different predetermined backup policy applied to a client computer classified in such backup category, wherein said obtaining comprises querying the client computer for information about a processor platform and operating system software being run on said client computer, and said classifying comprises classifying said client computer based upon said processor platform and said operating system information.

10. The method of claim 9, wherein said method further comprises determining from said information a computer type of said client computer, said computer type indicating whether the client computer is one of a server, a mobile, or a desktop computer, and said classifying comprises classifying the client computer into said one of a plurality of different backup categories according to the determined computer type.

11. A method of automatically classifying a client computer connected to a backup computer, comprising: automatically obtaining by the backup computer information about the client computer; and automatically classifying using said information and pre-selected criteria the client computer into one of a plurality of different backup categories, each backup category having a different predetermined backup policy applied to a client computer classified in such backup category, wherein said obtaining comprises obtaining identification information about said client computer, said identification information comprising one or more of the client computer's working group, organization, and location; and said classifying comprises classifying the client computer based upon said identification information.

12. The method of claim 11, wherein said backup computer and said client computer are connected to a network, and said obtaining identification information comprises requesting said identification information from a directory stored on said network.

13. The method of claim 11, wherein said method further comprises determining from said information a computer type of said client computer, said computer type indicating whether the client computer is one of a server, a mobile, or a desktop computer, and said classifying comprises classifying the client computer into said one of a plurality of different backup categories according to the determined computer type.

14. Non-transitory computer readable media storing instructions for controlling a backup computer system to perform a method of automatically classifying a client computer for backup, the method comprising: automatically obtaining information about the client computer; determining from said information a computer type of said client computer, said computer type indicating whether the client computer is one of a server, a mobile, or a desktop computer; and automatically classifying using said information and pre-selected criteria the client computer into one of a plurality of different backup categories according to the determined computer type, each backup category having a different predetermined backup policy applied to a client computer classified in such backup category.

15. The computer readable media of claim 14, wherein said determining comprises querying the client computer about battery status, and classifying said client computer as a mobile computer upon receiving a positive response to the query.

16. The computer readable media of claim 14, wherein said client computer and said backup computer are connected by a network comprising having a plurality of computers, and wherein said obtaining information comprises broadcasting to said plurality of computers a request for said information, the information including an identity of each computer; receiving responses to said request; identifying said computers from said responses; and determining from said responses whether each computer is included in said backup database.

17. The computer readable media of claim 16, wherein said obtaining comprises querying the client computer for information about a processor platform and operating system software being run on said client computer, and said classifying comprises classifying said client computer based upon said processor platform and said operating system information.

18. The computer readable media of claim 14, wherein said obtaining comprises obtaining identification information about said client computer, said identification information comprising one or more of the client computer's name, working group, organization, and location; and said classifying comprises classifying the client computer based upon said identification information.

19. A system for automatically classifying a client computer for backup, comprising: a backup computer, and non-transitory computer readable media storing computer executable instructions for controlling said backup computer to automatically obtain information about said client computer, said information determining whether the client computer is one of a server, a mobile, or a desktop type of computer; and to automatically classify said client computer into one of a plurality of backup categories based upon said type of computer and pre-selected criteria, each of said backup categories having a different predetermined backup policy.

20. The system of claim 19, wherein said information further comprises one or more of processor platform, operating software, and battery status.

* * * * *